(12) United States Patent
Petrovic et al.

(10) Patent No.: US 9,010,180 B2
(45) Date of Patent: Apr. 21, 2015

(54) METHOD AND OBSERVER FOR DETERMINING THE EXHAUST MANIFOLD TEMPERATURE IN A TURBOCHARGED ENGINE

(71) Applicant: Ford Global Technologies, LLC, Dearborn, MI (US)

(72) Inventors: Simon Petrovic, Aachen (DE); Michiel J. Van Nieuwstadt, Ann Arbor, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 13/738,848

(22) Filed: Jan. 10, 2013

(65) Prior Publication Data
US 2013/0174547 A1   Jul. 11, 2013

(30) Foreign Application Priority Data
Jan. 10, 2012   (EP) .................................... 12150647

(51) Int. Cl.
| | |
|---|---|
| *G01M 15/10* | (2006.01) |
| *F02M 25/07* | (2006.01) |
| *F02B 47/08* | (2006.01) |
| *F02D 41/14* | (2006.01) |
| *F02D 41/00* | (2006.01) |
| *F02B 39/16* | (2006.01) |

(52) U.S. Cl.
CPC ................ *F02M 25/07* (2013.01); *F02B 47/08* (2013.01); *F02D 41/1446* (2013.01); *F02D 41/1447* (2013.01); *F02D 41/0007* (2013.01); *F02D 2041/1416* (2013.01); *Y02T 10/144* (2013.01); *F02B 2039/164* (2013.01); *F02B 2039/168* (2013.01)

(58) Field of Classification Search
USPC ....................................................... 73/114.69
See application file for complete search history.

(56) References Cited

U.S. PATENT DOCUMENTS

| 6,092,016 A * | 7/2000 | Sarangapani et al. ........ 701/102 |
| 6,508,242 B2 | 1/2003 | Jaliwala et al. |
| 6,691,507 B1 | 2/2004 | Meyer et al. |

(Continued)

FOREIGN PATENT DOCUMENTS

| DE | 19525667 A1 | 1/1997 |
| DE | 102008044196 A1 | 6/2010 |
| WO | 03046356 A2 | 6/2003 |

OTHER PUBLICATIONS

ISA European Patent Office, Search Report of EP12150647.1, Sep. 12, 2012, Netherlands, 4 pages.

*Primary Examiner* — Eric S McCall
(74) *Attorney, Agent, or Firm* — Julia Voutyras; Alleman Hall McCoy Russell & Tuttle LLP

(57) ABSTRACT

The disclosure relates to a method and an observer for determining the exhaust manifold temperature in a turbocharged engine upstream of the turbine. In one example, a method for determining an exhaust manifold temperature in a turbocharged engine, the engine including a turbocharger and a turbine and the exhaust manifold temperature including a temperature upstream of the turbine, the method comprises estimating a value of the exhaust manifold temperature based on a model, measuring a temperature downstream of the turbine, and correcting the value of the exhaust manifold temperature based on the measurement.

18 Claims, 3 Drawing Sheets

(56) References Cited

U.S. PATENT DOCUMENTS

| | | | |
|---|---|---|---|
| 7,261,095 B2* | 8/2007 | Kein | 123/568.11 |
| 7,367,310 B2 | 5/2008 | Kakuya et al. | |
| 8,205,606 B2* | 6/2012 | Rodriguez et al. | 123/676 |
| 2002/0100467 A1* | 8/2002 | Jaliwala et al. | 123/676 |
| 2006/0276955 A1* | 12/2006 | Kein | 701/114 |
| 2008/0216557 A1 | 9/2008 | Wang et al. | |
| 2008/0300769 A1 | 12/2008 | Emery et al. | |
| 2010/0058747 A1* | 3/2010 | Rodriguez et al. | 60/299 |
| 2011/0154821 A1 | 6/2011 | Evans-Beauchamp | |
| 2013/0013166 A1* | 1/2013 | Petrovic et al. | 701/102 |

\* cited by examiner

METHOD AND OBSERVER FOR DETERMINING THE EXHAUST MANIFOLD TEMPERATURE IN A TURBOCHARGED ENGINE

CROSS REFERENCE TO RELATED APPLICATIONS

The present application claims priority to European Patent application 12150647.1, filed on Jan. 10, 2012, the entire contents of which are hereby incorporated by reference for all purposes.

FIELD

The present disclosure relates to a method and an observer for determining the exhaust manifold temperature in a turbocharged engine upstream of the turbine.

BACKGROUND AND SUMMARY

A recent trend in the automotive industry is to enhance the specific power, i.e. the peak power per engine displacement liter. This is achieved through either multi-turbocharging or mechanical supercharging or external boosting, such as e-boosting which makes use of an electrically driven compressor. Further approaches involve more efficient turbochargers with both higher compressor and turbine efficiencies and lower inertia. An industry-wide trend is the use of downsizing, driven by fuel consumption reduction requirements. This places requirements for turbocharger components, which means that in order to produce more compressed air, the turbine may operate closer to its thermal limit.

The exhaust manifold temperature upstream of the turbine (this temperature is here and in the following denoted as "T3") is an important parameter for modern diesel engine control. This temperature is used in particular for (i) turbo temperature protection (since a more accurate knowledge of T3 enables a closer control of the engine to the turbo limit and to extract more power from the engine), (ii) calculation of the EGR flow (since the orifice equation depends on the upstream EGR valve temperature), and (iii) prediction of the post turbo temperature used for aftertreatment modelling and OBD monitoring.

Conventional approaches involve a sensor for the pre-turbine temperature T3 in order to develop a limiting strategy. Typically, pre-turbine temperatures are limited to steady state limits of e.g. about 820-850° C. for diesel engines. For V-engines with separated exhaust manifolds, even two sensors can be necessary. However, since such temperature sensors are quite slow (with typical time constants of e.g. 1-2 s), a final steady state temperature measurement can take a significant amount of time of e.g. up to 10 s. Furthermore, although a large opening for the T3 sensor element gives a good response, soot and exhaust gases can reduce the accuracy and durability of such a sensor. Variations in exhaust conditions can have a further detrimental impact.

Furthermore, model-based turbocharger control is applied to complex, multi-stage or single stage turbocharger systems, which makes use not only of the compressor maps, but increasingly more of the turbine maps, such as pressure ratio versus corrected or reduced flow, but also turbine efficiency, for diagnostics, measures of performance degradation or increases in system performance, such as fuel economy. For such model-based calculations an accurate, dynamic T3 parameter is required.

Accordingly, the requirements for damage limitation, performance and model-based turbocharger control drive the demand for a fast, accurate T3 observer.

The inventors herein have recognized the above issues and provide a method and an observer for determining the exhaust manifold temperature upstream of the turbine in a turbocharged engine, which enables a sufficiently fast, accurate and robust determination of the exhaust manifold temperature with reduced effort and costs.

In one example, a method for determining an exhaust manifold temperature in a turbocharged engine, said engine including a turbocharger and a turbine and said exhaust manifold temperature including a temperature upstream of the turbine, said method comprises estimating a value of the exhaust manifold temperature based on a model, measuring a temperature downstream of the turbine, and correcting the value of the exhaust manifold temperature based on said measurement.

The disclosure involves the concept of constructing a fast and accurate T3 (=temperature upstream of the turbine) observer using a phenomenological/combustion-based T3 model, wherein the observer is robustified using a measurement of the temperature T4 (=temperature downstream of the turbine) and, as further described in the following, optionally a measurement or estimation of the turbocharger speed. The disclosure is also based on the concept to estimate the exhaust manifold temperature while avoiding the costs of an additional sensor. The disclosure presents a method to infer the exhaust manifold temperature from a model with correction from a downstream sensor which is required anyway, thus saving the cost of at least one sensor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

According to an embodiment, the step of correcting the value of the manifold temperature is also based on a determination of the turbocharger speed. The turbocharger speed can be measured using a turbocharger speed sensor or estimated using a model.

According to an embodiment, the step of correcting the value of the exhaust manifold temperature can be described by $$T_{3_{NEW}} = T_{3_{OLD}} + \kappa\left(T_{4_{MEAS_{NEW}}} - T_{4_{EST_{OLD}}}\right)$$

wherein $T_{d_{OLD}}$ denotes the uncorrected value of the exhaust manifold temperature (T3), κ denotes a gain factor, $$T_{4_{MEAS_{NEW}}}$$

denotes the measured temperature (T4) downstream of the turbine and $$T_{4_{EST_{OLD}}}$$

denotes an estimate of the temperature (T4) downstream of the turbine using the uncorrected value of the exhaust manifold temperature (T3).

According to an embodiment, the step of estimating a value of the exhaust manifold temperature based on a model can be described by $$T_3 = T_{22} + \Delta T(N, \lambda, \text{fuel}, SOI, \ldots)$$

wherein $T_{22}$ denotes the temperature in the intake manifold downstream of an exhaust gas recirculation (EGR) inlet, N is the engine speed, 2 is the air-fuel ratio, and SOI denotes the injection timing.

The disclosure also relates to an observer for determining the exhaust manifold temperature in a turbocharged engine, wherein said observer is configured to perform a method according to the present disclosure as described above.

As an overview, table 1 summarizes the meaning of abbreviations and symbols used in the disclosure:

TABLE 1

| | |
|---|---|
| γ | Ratio of Specific Heat Capacities |
| λ | Relative Air Fuel Ratio |
| κ | Closed Loop Gain |
| π | PRT Turbine Pressure Ratio |
| η | Turbine Efficiency |
| AT | Aftertreatment |
| MAF | Mass Airflow |
| T3/P3 | Temperature/Pressure Upstream Turbine |
| P1/T1 | Ambient Pressure/Temperature |
| SOI | Injection Timing |
| P22/T22 | Pressure/Temperature Intake Manifold Downstream EGR Mixing |
| EGR | Exhaust Gas Recirculation |
| T4 | Temperature Upstream AT (Downstream Turbine) |
| k | Discrete Counter for Real-Time Algorithm Implementation |
| TSS | Turbocharger Speed Sensor |
| TMAP | Temperature and Pressure Sensor in Intake Manifold |

Figure 1:
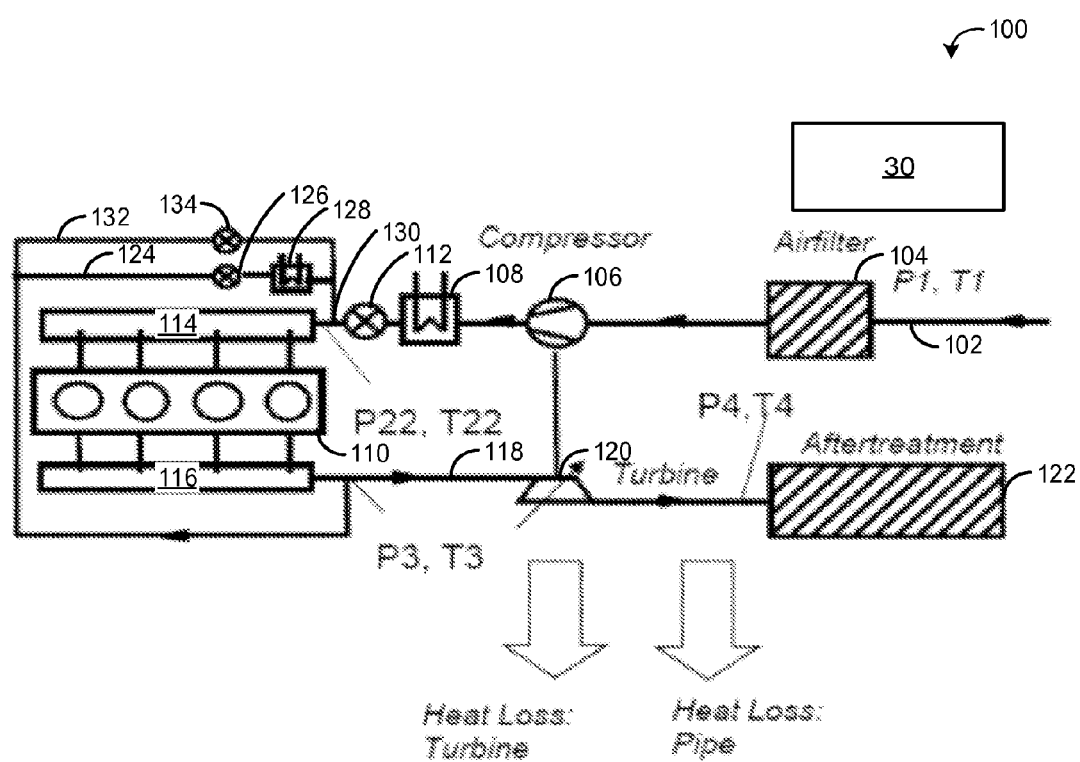
FIG. 1 shows a schematic representation of a typical engine layout in which a method of the present disclosure can be carried out.

FIG. 1 shows a schematic representation of a typical engine system 100 in which a method of the present disclosure can be carried out and in which some of the above-mentioned parameters are given. Engine system 100 includes an engine 110 having a plurality of cylinders. Intake air for combustion is drawn to engine 110 via intake passage 102. Prior to reaching engine 110, the intake air may pass through an air filter 104, turbocharger compressor 106, and/or charger air cooler (otherwise referred to as an intercooler) 108. The amount of intake air admitted to engine 110 may be controlled via throttle 112. An intake manifold 114 may collect intake air and deliver the intake air to the plurality of cylinders of engine 110.

The intake air in the cylinders may be supplied with fuel from one or more fuel injectors (not shown). Following combustion of the fuel, the exhaust products may be expelled via exhaust manifold 116 and exhaust passage 118 to atmosphere. Prior to reaching atmosphere, the exhaust gas may pass through turbocharger turbine 120 and/or aftertreatment device 122. Aftertreatment device 122 may include one or more of a three-way catalyst, NOx trap, particulate filter, oxidation catalyst, selective catalyst reduction system, or other aftertreatment device.

In some examples, a portion of the exhaust may be routed back to the intake manifold 114 via an exhaust gas recirculation (EGR) system. The EGR system may include an EGR passage 124 coupled to both exhaust passage 118 and intake passage 102. Flow of EGR through the EGR system may be controlled by EGR valve 126. Additionally, an EGR cooler 128 may cool the warm EGR gasses prior to reaching the intake manifold 114. The intake manifold and/or intake passage 102 may include an EGR inlet 130 where the EGR mixes with the intake air. Further, in some examples, an EGR bypass line 132 controlled by bypass valve 134 may bypass the EGR around EGR cooler 128.

Engine system 100 may include a controller 30 having a processor and memory. The memory of the controller may include computer-readable storage media executable by the processor for carrying out one or more control routines, such as the methods described herein. Controller 30 may receive inputs from one or more sensors of the engine (described below) and/or send signals to one or more actuators of the engine, such as throttle 112.

Engine system 100 may include a variety of sensors, such as temperature and pressure sensors, to determine the temperature and pressure in a variety of locations. As particularly shown in FIG. 1, the temperature "T4" is the temperature downstream of the turbine or upstream the first aftertreatment (=AT) device. Furthermore, the temperature "T22" is the manifold temperature after the EGR mixing (e.g., after the EGR mixes with the intake air or after an EGR inlet in the intake manifold). P4, i.e. the pressure downstream of the turbine, is generally available due to aftertreatment requirements, while P3 (i.e. the pressure upstream of the turbine) can be estimated or measured. It is to be noted that P4 may be corrected due to pressure losses, depending on the pipe distance form the turbine outlet to the AT inlet.

An engine controller 30 includes a microprocessor unit, input/output ports, an electronic storage medium for executable programs and calibration values e.g., a read only memory chip, random access memory, keep alive memory, and a data bus. Controller 30 may receive various signals from sensors coupled to engine 110, including measurement of inducted mass air flow (MAF) from a mass air flow sensor; engine coolant temperature (ECT) from a temperature sensor; a profile ignition pickup signal (PIP) from a Hall effect sensor (or other type) coupled to the engine crankshaft; throttle position (TP) from a throttle position sensor; and absolute manifold pressure signal, MAP, from a pressure sensor. Engine speed signal, RPM, may be generated by controller 30 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor, which is also used as an engine speed sensor, may produce a predetermined number of equally spaced pulses every revolution of the crankshaft. Controller 30 may send signals to control various engine actuators, including EGR valve 126 and/or 134, throttle 112, and other actuators.

The storage medium read-only memory of controller 30 can be programmed with computer readable data representing instructions executable by the processor for performing the methods described below as well as other variants that are anticipated but not specifically listed. The observer, referred to above and described below, may be part of controller 30.

Figure 2:
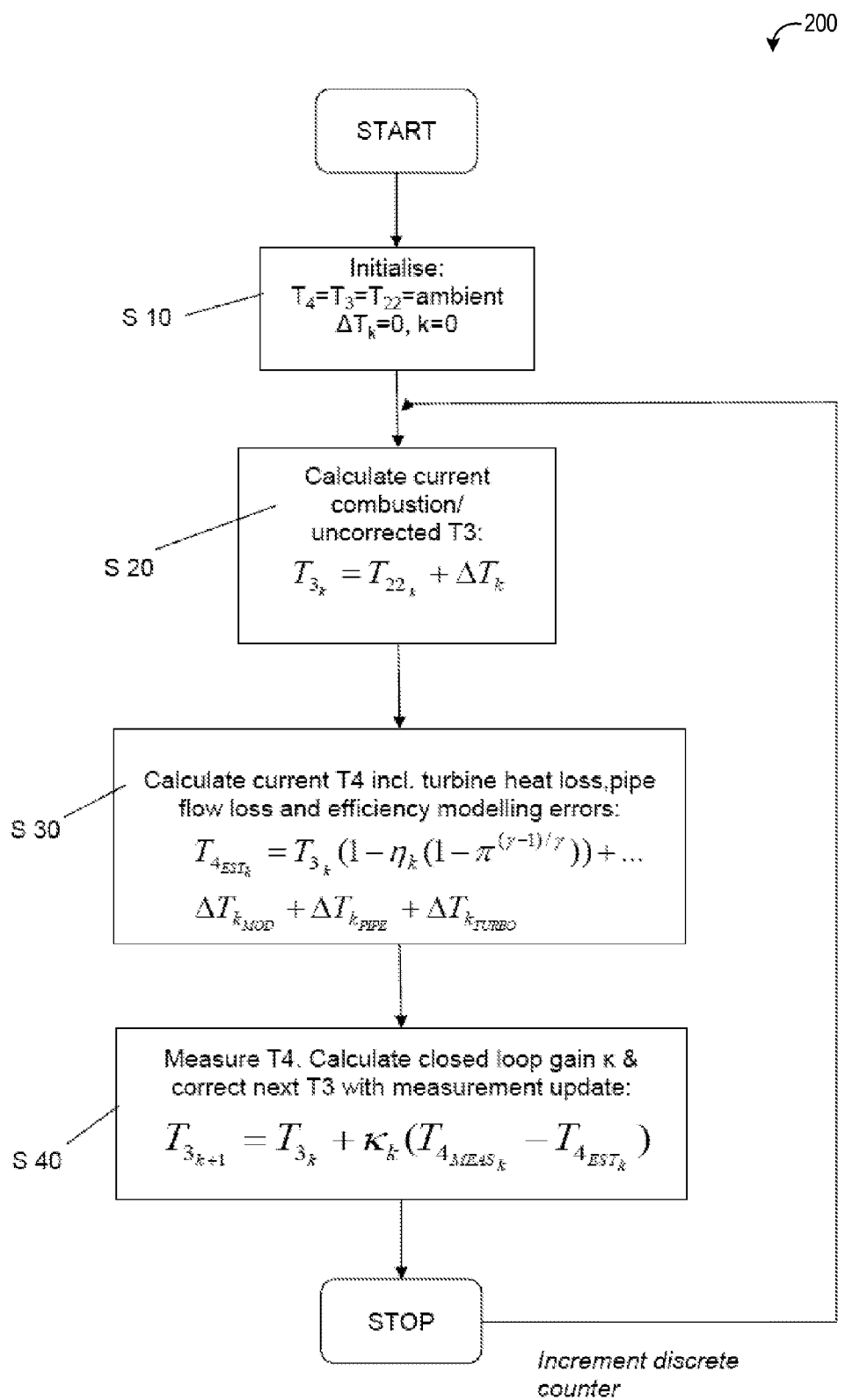
FIG. 2 is a flowchart illustrating an embodiment of the method according to the present disclosure.

FIG. 2 shows a flowchart illustrating an embodiment of the method 200 according to the present disclosure.

According to FIG. 2, step S10 involves, at the beginning of the inventive algorithm, an initialization of the values T4, T3, T22 further used in the following. That is, each of the values for T4, T3, and T22 may be set to zero or other initial value.

In step S20, an uncorrected value for the exhaust manifold temperature T3 is calculated using an open loop model for T3 as follows $$T_3 = T_{22} \pm \Delta T(N, \lambda, \text{fuel}, SOI, \ldots) \quad (1)$$

In equation (1), $T_{22}$ denotes the temperature in the intake manifold downstream of an exhaust gas recirculation inlet (EGR mixing), $\lambda$ is the air-fuel ratio, and SOI denotes the injection timing. Accordingly, the exhaust manifold temperature T3 is modelled as a combustion offset to the temperature T22 and as a function of (at least) engine speed, exhaust lambda value $\lambda$ (which can either be measured using a sensor or which can alternatively be calculated using the mass airflow MAF and the amount of the injected fuel) and injection timing SOI.

The such calculated value of the exhaust manifold temperature T3 is then corrected with the inventive observer using the temperature upstream of the turbine and then feeding the difference between a measured value $$T_{4_{MEAS_{NEW}}}$$

of the temperature T4 downstream of the turbine and a modelled value $$T_{4_{EST_{OLD}}}$$

of the temperature T4 downstream the turbine back to the estimated value of the exhaust manifold temperature T3 upstream of the turbine.

In step S30, the temperature T4 downstream of the turbine is calculated which considering turbine heat losses, pipe flow losses and efficiency modelling errors.

In the following, the corresponding mathematical relations are described in more detail:

The turbine efficiency $\eta$ can be described either as a function of flow/turbine pressure ratio (PRT) or a function of turbine speed sensor (TSS)/PRT, wherein the latter is more accurate since the mass airflow (=MAF) sensor used to calculate turbine flow can deteriorate with in-city driving. The value PRT is defined as the upstream turbine pressure divided by the downstream turbine pressure and can be measured or estimated.

Equation (2) shows the T3/T4-relationship based on a turbine model:

$$T_3 = \frac{T_4}{1 - \eta\left(1 - (\pi)^{\frac{\gamma-1}{\gamma}}\right)} = f(T_4, \eta, \pi) \quad (2)$$

which can be rearranged to explicitly calculate the temperature T4. A relation for the turbine efficiency $\eta$ is given in equation (3):

$$\eta = \eta\left(\frac{N_T}{\sqrt{T_3}} \pi\right) \quad (3)$$

or $$\eta = \eta\left(\frac{\Phi_T \sqrt{T_3}}{P_3} \pi\right)$$

or $$\eta = \eta\left(\frac{\Phi_T \sqrt{T_3/T_{3_{ref}}}}{P_3/P_{3_{ref}}} \pi\right)$$

or $$\eta = \eta(VNT, \pi)$$

Accordingly, the turbine efficiency $\eta$ can be calculated as a function of reduced turbocharger speed/reduced flow/corrected flow/variable nozzle turbine (VNT) position (where applicable) and pressure ratio. The index "ref" refers to turbocharger measurement reference pressure and temperature. It is to be noted that T3 appears explicitly. In implementation, the previously calculated T3 is used to prevent algebraic loops, or, $T_{3(k)} \rightarrow T_{3(k-1)}$. In practice, there is some turbocharger speed dependency on efficiency, but if a turbocharger speed sensor (TSS) is not available, as an approximation other formulations can be used for the VNT fully open case. It is to be noted that the disclosure is not specifically limited to a variable geometry of the turbocharger.

The following are temperature offsets: modelling error as a function of turbine parameters (e.g. reduced speed), heat loss due to the distance from turbine outlet to the T4 sensor modelled as a pipe ($Q_{in}$ heat input, $C_{p,g}$ thermal capacity, and pipe flow m), and heat loss due to turbine heat transfer, through the metal housing to ambient T1 (details of derivation not shown). The functions g and h may be expanded, and the heat losses can be gathered from equation (4):

$$\Delta T_{4_{MOD}} = g\left(\frac{N_T}{\sqrt{T_3}} \pi\right), \quad (4)$$

$$\Delta T_{4_{TURBO}} = h(T3 - .T1),$$

$$\Delta T_{4_{PIPE}} = \frac{-Q_{in}}{\dot{m} C_{p,g}}$$

T4 sensor dynamics are normally slow, so if a sensor is placed for aftertreatment (AT) requirements, such a sensor can be arranged relatively far away from turbine outlet. The sensitivity can be described by the total differential of T3 as follows:

$$dT_3 = \frac{\partial f}{\partial T_4}dT_4 + \frac{\partial f}{\partial \eta}d\eta + \frac{\partial f}{\partial \pi}d\pi \quad (5)$$

The sensitivities are given by:

$$\frac{\partial f}{\partial T_4} = \frac{1}{1 - \eta\left(1 - (\pi)^{\frac{\gamma-1}{\gamma}}\right)} \quad (6)$$

$$\frac{\partial f}{\partial \eta} = \frac{T_4\left(1 - (\pi)^{\frac{\gamma-1}{\gamma}}\right)}{\left[1 - \eta\left(1 - (\pi)^{\frac{\gamma-1}{\gamma}}\right)\right]^2}$$

$$\frac{\partial f}{\partial \pi} = \frac{-T_4\eta\left(\frac{\gamma-1}{\gamma}\right)(\pi)^{\frac{-1}{\gamma}}}{\left[1 - \eta\left(1 - (\pi)^{\frac{\gamma-1}{\gamma}}\right)\right]^2}$$

It can be assumed that the sensitivity to T4 is the most important factor, and the $\eta/\pi$(PRT) factors can be discarded in a good approximation. The sensitivity equation therefore reduces to the only first term. A closed-loop form with T4 step as a robustification can be considered. A detailed implementation would follow the flowchart shown in FIG. 2.

The compact observer form is given in Equation (7):

$$T_{3_{NEW}} = T_{3_{OLD}} + \kappa\left(T_{4_{MEAS_{NEW}}} - T_{4_{EST_{OLD}}}\right) \quad (7)$$

In summary, as indicated at S40, the new value of the temperature T3 upstream of the turbine corresponds to the "old", uncorrected temperature T3 plus a gain factor multiplied with the difference between the "new" T4-measurement and the efficiency-based T4 estimate using the uncorrected T3.

Figure 3:
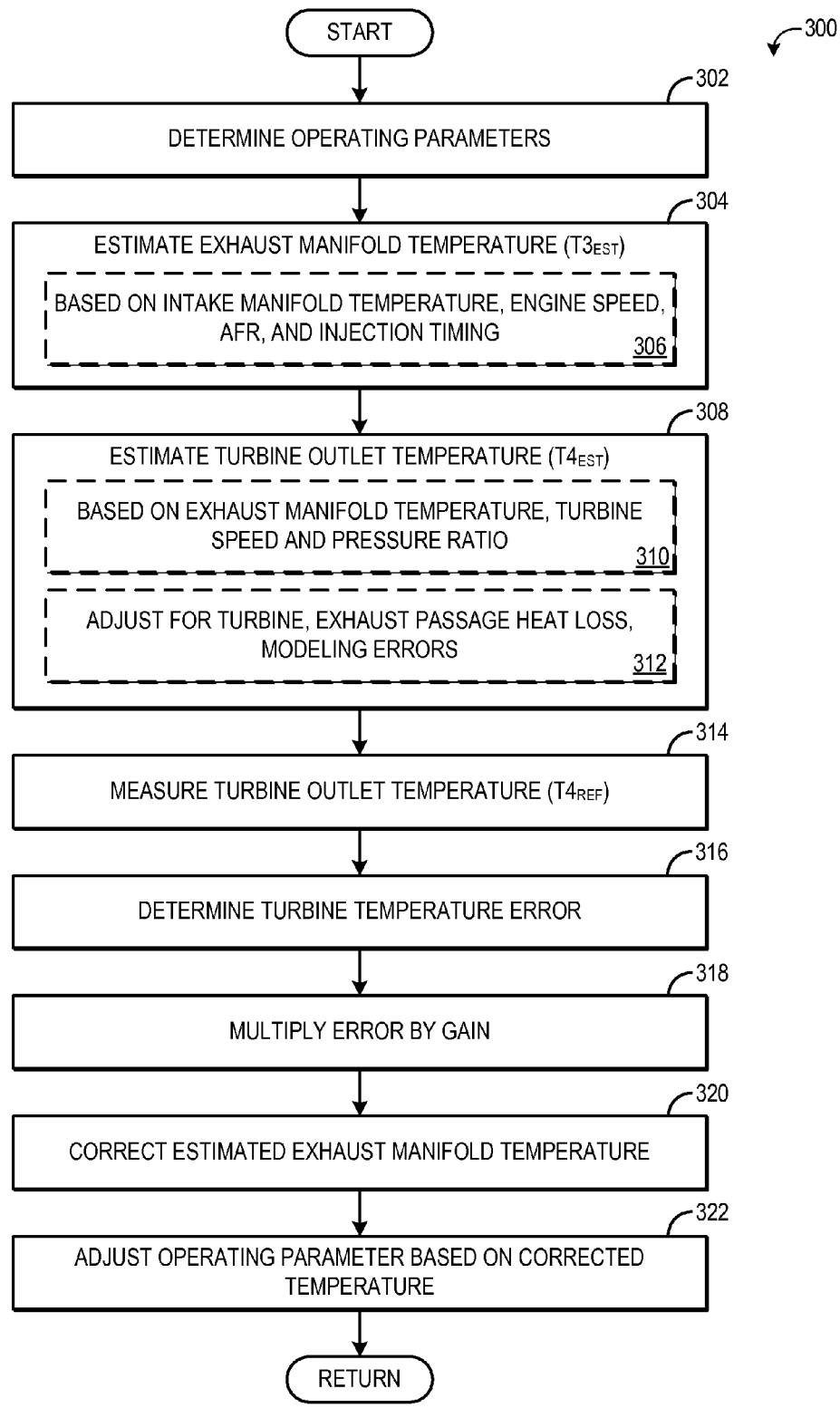
FIG. 3 is a flow chart illustrating a method for determining a corrected exhaust manifold temperature according to an embodiment of the disclosure.

Turning now to FIG. 3, a method 300 for determining a corrected exhaust manifold temperature is provided. Method 300 may be performed by an engine controller, such as controller 30, according to instructions stored thereon. At 302, method 300 includes determining engine operating parameters. The engine operating parameters may include, but are not limited to, intake manifold temperature, turbine inlet and/or outlet temperature, turbine pressure ratio, air-fuel ratio, fuel injection parameters (such as timing and/or quantity), and other parameters.

At 304, an estimated exhaust manifold temperature ($T3_{EST}$) is calculated. The estimated exhaust manifold temperature may be estimated based on intake manifold temperature, engine speed, air-fuel ratio, and injection timing as indicated at 306. The intake manifold temperature dictates the temperature of the charge air entering the cylinders prior to combustion. Then, the exhaust manifold temperature may be estimated by augmenting the intake manifold temperature with the amount of heat generated during combustion. The heat produced during combustion is a function of engine speed, air-fuel ratio, and fuel injection timing (or spark timing if a spark-ignition system is used). In some embodiments, $T3_{EST}$ may be calculated according to equation (1) described previously.

At 308, an estimated turbine outlet temperature ($T4_{EST}$) is calculated. The estimated turbine outlet temperature may be estimated based on the estimated exhaust manifold temperature ($T3_{EST}$) described above, turbine speed, and turbine pressure ratio, as indicated at 310. The turbine speed may be determined by a turbine speed sensor, or it may be estimated based on a model. In some examples, $T4_{EST}$ may be calculated according to equation (2) described above.

As will be explained in more detail below, $T4_{EST}$ may be compared to a measured turbine outlet temperature in order to determine a turbine temperature error. In order to estimate a turbine outlet temperature that closely resembles the measured turbine outlet temperature, $T4_{EST}$ may be adjusted at 312 to account for heat loss and modelling errors and thus reflect the actual temperature at the turbine outlet where the turbine temperature sensor is actually located. Thus, the estimated turbine outlet temperature may be adjusted based on heat loss from the turbine, heat loss from the exhaust passage, and/or modelling errors.

At 314, the turbine outlet temperature ($T4_{REF}$) is measured. At 316, the turbine temperature error is determined by calculating the difference between the estimated and measured turbine outlet temperature. At 318, the turbine error is multiplied by a gain. In one example, the gain may be dependent on engine speed and torque. At 320, the estimated exhaust manifold temperature is corrected based on the turbine temperature error and gain. In one example, the estimated exhaust manifold temperature ($T3_{EST}$) may be added to the product of the gain and the turbine error, as explained above with respect to equation (7). In this way, the turbine temperature error indicates the level of difference between the measured turbine outlet temperature and the estimated turbine outlet temperature. Because the estimated turbine outlet temperature is based, in part, on the estimated exhaust manifold temperature, the turbine temperature error may be at least partially attributed to an error in the initial exhaust manifold temperature estimation. Thus, the estimated exhaust manifold temperature may be corrected based on the turbine temperature error. Because the estimated turbine temperature is also based on other parameters, the gain may be adjusted to account for the contribution of those parameters to the error. For example, during high engine speed and load, the turbine speed determination may be more inaccurate than during lower engine speeds and loads. Thus, the gain may be adjusted based on engine speed and load to account for such differences.

At 322, one or more engine operating parameters may be adjusted based on the corrected exhaust manifold temperature. The adjusted engine operating parameters may include an amount of exhaust gas recirculation (EGR) flow, which may be regulated by an EGR valve (e.g., valve 126).

Thus, the systems and methods described herein provide for a method comprising correcting an estimated exhaust manifold temperature based on a turbine temperature error, the estimated exhaust manifold temperature based on intake manifold temperature, engine speed, air fuel ratio, and fuel injection timing; and adjusting an engine operating parameter based on the corrected exhaust manifold temperature.

The turbine temperature error may be a difference between an estimated turbine outlet temperature and a measured turbine outlet temperature. The estimated turbine outlet temperature may be based on the estimated exhaust manifold temperature, turbine speed, and turbine pressure ratio. Adjusting the engine operating parameter may include adjusting the position of an exhaust gas recirculation valve.

In another example, a system comprises an engine coupled to an exhaust manifold and an intake manifold; a turbocharger including a turbine positioned downstream of the exhaust manifold; an exhaust gas recirculation (EGR) system configured to divert a portion of exhaust gas from upstream of the turbine back to the intake manifold; and a controller including instructions to estimate an exhaust manifold temperature based on intake manifold temperature, engine speed, air fuel ratio, and fuel injection timing, correct the estimated exhaust manifold temperature based on a turbine temperature error, and adjust an EGR valve based on the corrected exhaust manifold temperature.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for determining an exhaust manifold temperature in an engine, including a turbocharger and a turbine and said exhaust manifold temperature including a temperature upstream of the turbine, said method comprising:
   estimating a value of the exhaust manifold temperature based on an exhaust manifold temperature model including at least sensed intake manifold temperature;
   measuring a temperature downstream of the turbine; and
   correcting the value of the exhaust manifold temperature based on said measurement.

2. The method according to claim 1, wherein correcting the value of the exhaust manifold temperature is based on a determination of turbocharger speed.

3. The method according to claim 2, wherein the turbocharger speed is measured using a turbocharger speed sensor.

4. The method according to claim 2, wherein the turbocharger speed is estimated using a turbocharger speed model.

5. The method according to claim 1, wherein the value of the exhaust manifold temperature is corrected based on an uncorrected value of the exhaust manifold temperature, a gain factor, the measured temperature downstream of the turbine, and an estimate of the temperature downstream of the turbine using the uncorrected value of the exhaust manifold temperature.

6. The method according to claim 1, wherein the value of the exhaust manifold temperature based on the exhaust manifold temperature model is estimated according to the sensed intake manifold temperature measured downstream of an exhaust gas recirculation inlet, engine speed, air-fuel ratio, and injection timing.

7. A method, comprising:
   estimating an exhaust manifold temperature based on sensed intake manifold temperature, engine speed, air fuel ratio, and fuel injection timing;
   correcting the estimated exhaust manifold temperature based on a turbine temperature error; and
   adjusting an engine operating parameter based on the corrected exhaust manifold temperature.

8. The method of claim 7, further comprising estimating a turbine outlet temperature based on the estimated exhaust manifold temperature, turbine speed, and turbine pressure ratio.

9. The method of claim 8, further comprising determining a difference between the estimated turbine outlet temperature and a measured turbine outlet temperature to determine the turbine temperature error.

10. The method of claim 8, wherein the estimated turbine outlet temperature is adjusted based on turbine and/or exhaust passage heat loss.

11. The method of claim 7, wherein correcting the estimated exhaust manifold temperature based on the turbine temperature error further comprises correcting the estimated exhaust manifold temperature based on a closed-loop gain, wherein the closed-loop gain is a function of engine speed and torque.

12. The method of claim 7, wherein adjusting the engine operating parameter comprises adjusting a position of an exhaust gas recirculation valve.

13. A system, comprising:
   an engine coupled to an exhaust manifold and an intake manifold;
   a turbocharger including a turbine positioned downstream of the exhaust manifold;
   an exhaust gas recirculation (EGR) system configured to divert a portion of exhaust gas from upstream of the turbine back to the intake manifold;
   a temperature sensor positioned to measure intake manifold temperature downstream of an inlet of the EGR system; and
   a controller including instructions to:
      estimate an exhaust manifold temperature based on intake manifold temperature measured by the temperature sensor, engine speed, air fuel ratio, and fuel injection timing;
      correct the estimated exhaust manifold temperature based on a turbine temperature error; and
      adjust an EGR valve based on the corrected exhaust manifold temperature.

14. The system of claim 13, wherein the controller includes further instructions to estimate a turbine outlet temperature based on the estimated exhaust manifold temperature, turbine speed, and turbine pressure ratio.

15. The system of claim 14, wherein the controller includes further instructions to determine a difference between the estimated turbine outlet temperature and a measured turbine outlet temperature to determine the turbine temperature error.

16. The system of claim 14, wherein the estimated turbine outlet temperature is adjusted based on turbine and/or exhaust passage heat loss.

17. The system of claim 13, wherein the controller includes instructions to correct the estimated exhaust manifold temperature based on a closed-loop gain.

18. The system of claim 17, wherein the closed-loop gain is a function of engine speed and torque.

* * * * *